United States Patent
Yu et al.

(10) Patent No.: US 12,537,541 B2
(45) Date of Patent: Jan. 27, 2026

(54) METHOD AND APPARATUS WITH DATA COMPRESSION AND/OR DECOMPRESSION

(71) Applicant: Samsung Electronics Co., Ltd., Suwon-si (KR)

(72) Inventors: Hyeongseok Yu, Suwon-si (KR); Deok Jae Oh, Suwon-si (KR); Seong Wook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 18/406,521

(22) Filed: Jan. 8, 2024

(65) Prior Publication Data
US 2024/0235575 A1     Jul. 11, 2024

(30) Foreign Application Priority Data

Jan. 11, 2023    (KR) ........................ 10-2023-0004218

(51) Int. Cl.
*H03M 7/40*            (2006.01)
*H03M 7/30*            (2006.01)

(52) U.S. Cl.
CPC ......... *H03M 7/405* (2013.01); *H03M 7/3064* (2013.01)

(58) Field of Classification Search
CPC .......... H03M 7/30; H03M 7/40; H03M 7/405; H03M 7/3064; H03M 7/6023; H03M 7/6005; H03M 7/6017
See application file for complete search history.

(56) References Cited

U.S. PATENT DOCUMENTS

| | | | | |
|---|---|---|---|---|
| 5,389,922 A | * | 2/1995 | Seroussi ................. | H03M 7/46 341/51 |
| 5,798,719 A | | 8/1998 | Wise et al. | |
| 5,973,630 A | * | 10/1999 | Heath ..................... | H03M 7/40 341/51 |
| 6,081,211 A | * | 6/2000 | de Queiroz .......... | H04N 19/146 375/E7.231 |
| 6,850,647 B1 | * | 2/2005 | Gough ................... | H04N 19/61 358/426.14 |
| 6,941,019 B1 | * | 9/2005 | Mitchell ................ | H04N 19/40 375/E7.129 |

(Continued)

FOREIGN PATENT DOCUMENTS

| KR | 10-2019-0094496 A | 8/2019 |
|---|---|---|
| KR | 10-2022-0049522 A | 4/2022 |

OTHER PUBLICATIONS

Choi et al. "A High-Throughput Hardware Accelerator for Lossless Compression of a DDR4 Command Trace" *IEEE Transactions on Very Large Scale Integration (VLSI) Systems*, vol. 27, No. 1, Jan. 2019 (pp. 92-102).

(Continued)

*Primary Examiner* — Lam T Mai
(74) *Attorney, Agent, or Firm* — NSIP Law

(57) ABSTRACT

A processor-implemented method including generating k sub-compressed data streams based on a compressed data stream for a plurality of symbols divided into a plurality of k blocks and count information for each of the plurality of k blocks, generating k sub-symbols by processing each of the k sub-compressed data streams using k decoding engines, metadata about the compressed data stream, and generating an output data stream corresponding to the plurality of symbols based on the k sub-symbols.

20 Claims, 12 Drawing Sheets

(56) References Cited

U.S. PATENT DOCUMENTS

| | | | | |
|---|---|---|---|---|
| 8,253,608 B2 * | 8/2012 | Hughes | | H03M 7/3086 |
| | | | | 341/51 |
| 8,520,958 B2 | 8/2013 | Singh et al. | | |
| 8,756,332 B2 | 6/2014 | Fallon | | |
| 8,788,894 B2 * | 7/2014 | Kang | | G11C 29/00 |
| | | | | 714/723 |
| 9,998,144 B2 * | 6/2018 | Cideciyan | | H03M 7/40 |
| 10,020,819 B1 * | 7/2018 | Diamant | | H03M 7/4037 |
| 10,229,688 B2 * | 3/2019 | Abe | | G10L 19/00 |
| 10,268,380 B2 | 4/2019 | Arelakis et al. | | |
| 10,333,548 B1 * | 6/2019 | Sofia | | H03M 7/6011 |
| 10,831,655 B2 * | 11/2020 | Arelakis | | G06F 3/064 |
| 11,962,335 B2 * | 4/2024 | Pope | | H03M 7/42 |
| 2003/0031246 A1 * | 2/2003 | Heath | | H03M 7/40 |
| | | | | 375/240 |
| 2003/0081844 A1 * | 5/2003 | Sadeh | | H04N 19/635 |
| | | | | 382/248 |
| 2005/0002579 A1 * | 1/2005 | Mitchell | | H04N 19/102 |
| | | | | 382/233 |
| 2005/0219078 A1 * | 10/2005 | Gough | | H04N 19/44 |
| | | | | 375/E7.137 |
| 2008/0131015 A1 * | 6/2008 | Imata | | H04N 19/15 |
| | | | | 375/E7.157 |
| 2008/0252495 A1 * | 10/2008 | Mitchell | | G06F 12/0886 |
| | | | | 341/60 |
| 2008/0273803 A1 * | 11/2008 | Gough | | H04N 19/42 |
| | | | | 375/E7.137 |
| 2009/0058693 A1 * | 3/2009 | Laker | | H03M 7/40 |
| | | | | 341/65 |
| 2009/0141991 A1 * | 6/2009 | Mitchell | | H04N 19/44 |
| | | | | 382/233 |
| 2011/0264669 A1 * | 10/2011 | Lu | | G06F 9/445 |
| | | | | 707/747 |
| 2013/0117630 A1 * | 5/2013 | Kang | | G06F 11/1048 |
| | | | | 714/763 |
| 2015/0130646 A1 * | 5/2015 | Huang | | H03M 7/3088 |
| | | | | 341/67 |
| 2016/0041919 A1 | 2/2016 | Hawkes et al. | | |
| 2019/0245554 A1 * | 8/2019 | Choi | | H03M 7/40 |
| 2019/0246117 A1 * | 8/2019 | Hugosson | | H04N 19/46 |
| 2019/0266756 A1 * | 8/2019 | Chun | | H04N 19/142 |
| 2019/0273508 A1 * | 9/2019 | Bennett | | H03M 7/3086 |
| 2022/0224353 A1 | 7/2022 | Gopal et al. | | |
| 2022/0276923 A1 * | 9/2022 | Grube | | H03M 13/1515 |
| 2023/0318621 A1 * | 10/2023 | Pope | | H03M 7/6023 |
| | | | | 341/51 |

OTHER PUBLICATIONS

Korean Office Action Issued on May 1, 2024, in Counterpart Korean Patent Application No. 10-2023-0004218 (2 Pages in English, 5 Pages in Korean).

* cited by examiner

METHOD AND APPARATUS WITH DATA COMPRESSION AND/OR DECOMPRESSION

CROSS-REFERENCE TO RELATED APPLICATIONS

This application claims the benefit under 35 USC § 119(a) of Korean Patent Application No. 10-2023-0004218, filed on Jan. 11, 2023, in the Korean Intellectual Property Office, the entire disclosure of which is incorporated herein by reference for all purposes.

BACKGROUND

1. Field

The following description relates to a method and apparatus with data compression and/or decompression.

2. Description of Related Art

Data compression technology may reduce the size of a storage space for storing data and may allow a smaller number of frequency bands to be used for data transmission.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including obtaining target data comprising a compressed data stream for a plurality of symbols divided into a plurality of k blocks, metadata about the compressed data stream, and count information for each of the plurality of k blocks, storing the compressed data stream in an input buffer, generating k sub-compressed data streams based on the count information and the compressed data stream stored in the input buffer, generating k sub-symbols by processing each of the k sub-compressed data streams using k decoding engines, metadata about the compressed data stream, and generating an output decoded data stream corresponding to the plurality of symbols based on the k sub-symbols.

The compressed data stream may include codewords generated by processing the plurality of symbols using Huffman coding and the metadata includes binary tree information about the Huffman coding.

The count information may include first count information indicating a length of first codewords for symbols of a first block among the plurality of k blocks and second count information indicating a length of second codewords for symbols of a second block among the plurality of k blocks.

The count information may include first count information indicating a length of first codewords for a first block among the plurality of k blocks and second count information indicating a sum of the length of the first codewords for the first block and a length of second codewords for a second block among the plurality of k blocks.

The generating of the k sub-compressed data streams may include generating a first sub-compressed data stream based on codewords of first regions of the input buffer, in which first codewords for a first block among the plurality of k blocks are stored and generating a second sub-compressed data stream based on codewords of second regions of the input buffer in which second codewords for a second block among the plurality of k blocks are stored.

The first regions of the input buffer and the second regions of the input buffer may include one or more same overlap regions.

The generating of the k sub-symbols may include determining a first valid sub-compressed data stream in a first sub-compressed data stream among the k sub-compressed data streams and generating first sub-symbols by processing the first valid sub-compressed data stream using a first decoding engine among the k decoding engines.

The method may include obtaining state information from the k decoding engines and scheduling, based on the state information, the k decoding engines for processing k additional sub-compressed data streams, of an additional compressed data stream of the additional target data, generated based on the additional compressed data stream, and the k additional sub-compressed data streams are processed by the k decoding engines based on the scheduling.

In a general aspect, here is provided an electronic apparatus including a processor configured to execute instructions and a memory storing the instructions, wherein execution of the instructions by the processor configures the processor to obtain target data comprising a compressed data stream for a plurality of symbols divided into a plurality of k blocks, metadata about the compressed data stream, and count information for each of the plurality of k blocks, store the compressed data stream in an input buffer, generate k sub-compressed data streams based on the count information and the compressed data stream stored in the input buffer, generate k sub-symbols by processing each of the k sub-compressed data streams using k decoding engines, and generate a decoded output data stream corresponding to the plurality of symbols based on the k sub-symbols.

The compressed data stream may include codewords generated by processing the plurality of symbols using Huffman coding and the metadata includes binary tree information about the Huffman coding.

The count information may include first count information indicating a length of first codewords for symbols of a first block among the plurality of k blocks and second count information indicating a length of second codewords for symbols of a second block among the plurality of k blocks.

The count information may include first count information indicating a length of first codewords for a first block among the plurality of k blocks and second count information indicating a sum of the length of the first codewords for the first block and a length of second codewords for a second count for a second block among the plurality of k blocks.

The generating of the k sub-compressed data streams may include generating a first sub-compressed data stream based on codewords of first regions of the input buffer, in which first codewords for a first block among the plurality of k blocks are stored and generating a second sub-compressed data stream based on codewords of second regions of the input buffer in which second codewords for a second block among the plurality of k blocks are stored.

The generating of the k sub-symbols may include determining a first valid sub-compressed data stream in a first sub-compressed data stream among the k sub-compressed data streams and generating first sub-symbols by processing the first valid sub-compressed data stream using a first decoding engine among the k decoding engines.

The processor may be further configured to perform obtaining state information from the k decoding engines, and scheduling, based on the state information, the k decoding engines for processing k additional sub-compressed data streams, of an additional compressed data stream of the additional target data, generated based on the additional compressed data stream, and the k additional sub-compressed data streams are processed by the k decoding engines based on the scheduling.

In a general aspect, here is provided an electronic apparatus including a processor configured to execute instructions and a memory storing the instructions, as an execution of the instructions by the processor configures the processor to generate k sub-compressed data streams based on a compressed data stream representing a plurality of symbols divided into a plurality of k blocks, metadata about the compressed data stream, and count information for each of the plurality of k blocks, generate k sub-symbols by processing each of the k sub-compressed data streams using k decoding engines, and generate a decoded output data stream corresponding to the plurality of symbols based on the k sub-symbols.

The compressed data stream may include codewords generated by processing the plurality of symbols using Huffman coding and the metadata may include binary tree information about the Huffman coding.

The count information may include first count information indicating a length of first codewords for symbols of a first block among the plurality of k blocks and second count information indicating a length of second codewords for symbols of a second block among the plurality of k blocks.

The count information may include first count information indicating a length of first codewords for a first block among the plurality of k blocks and second count information indicating a sum of the length of the first codewords for the first block and a length of second codewords for a second count for a second block among the plurality of k blocks.

The generating of the k sub-compressed data streams may include generating a first sub-compressed data stream based on codewords of first regions of an input buffer, of an electronic apparatus, in which first codewords for a first block among the plurality of k blocks are stored and generating a second sub-compressed data stream based on codewords of second regions of the input buffer in which second codewords for a second block among the plurality of k blocks are stored.

The generating of the k sub-symbols may include determining a first valid sub-compressed data stream in a first sub-compressed data stream among the k sub-compressed data streams and generating first sub-symbols by processing the first valid sub-compressed data stream using a first decoding engine among the k decoding engines.

The processor may be configured to perform obtaining state information from the k decoding engines and scheduling, based on the state information, the k decoding engines for processing k additional sub-compressed data streams, of an additional compressed data stream of additional target data, generated based on the additional compressed data stream, and the k additional sub-compressed data streams are processed by the k decoding engines based on the scheduling.

In a general aspect, here is provided a processor-implemented method including dividing a plurality of symbols into a plurality of k blocks, generating first codewords by compressing symbols of a first block among the plurality of k blocks, generating first partial metadata for the compressing, generating first count information indicating a length of the first codewords, and generating compressed data representing the plurality of symbols based on the first codewords, the first partial metadata, and the first count information.

The compressed data may be a lossless compression of the plurality of symbols.

The generating of the compressed data may include generating a compressed data stream for the plurality of symbols based on the first codewords, generating metadata about the compressed data stream based on the first partial metadata, generating count information about a length of codewords for each of the plurality of k blocks based on the first count information, and generating the compressed data based on the compressed data stream, the metadata, and the count information.

The count information may include the first count information and second count information indicating a sum of the length of the first codewords for the first block and a length of second codewords for a second count for a second block.

The generating of the first codewords may include generating the first codewords by processing the symbols of the first block using Huffman coding and wherein the first partial metadata may include binary tree information about the Huffman coding.

In a general aspect, here is provided an electronic system including one or more processors configured to execute respective compression and decompression instructions and one or more memories storing the instructions, wherein execution of the respective instructions by the one or more processors configures the one or more processor to compress a plurality of symbols, wherein the compression including division of the plurality of symbols into a plurality of k blocks, generation of a plurality of codewords by compressing symbols from among the plurality of k blocks, generation of respective metadata for each of the plurality of codewords, a counting of respective lengths of the plurality of codewords as count information, and generation of compressed data for the plurality of symbols according to a respective codewords, metadata, and count information for the plurality of symbols, and decompress obtained compressed data, the decompression including generation of k sub-compressed data streams based on the count information from the compressed data, a decoding of the k sub-compressed data streams into k sub-symbols according to respective codewords in the compressed data, and generation of decoded data based on the k sub symbols.

The decoding of the k sub-compressed data streams may include storing the compressed data stream from the compressed data where the plurality of codewords are stored in respective arrays of an input buffer, determining aberration information between one or more codewords in a shared array among the respective arrays, and separating respective codewords based on the aberration information.

The decoding of the k sub-compressed data streams may include storing the compressed data stream from the compressed data where the plurality of codewords are stored in respective arrays of an input buffer, determining aberration information between one or more codewords in a shared array among the respective arrays, and separating respective codewords based on the aberration information.

The compression may be performed by a first electronic apparatus, including a first processor of the one or more processors and a first memory of the one or more memories, and the decompression may be performed by a second electronic apparatus, including a second processor of the one or more processors and a second memory of the one or more memories.

The obtained compressed data may be the generated compressed data.

Other features and aspects will be apparent from the following detailed description, the drawings, and the claims.

Figure 1:
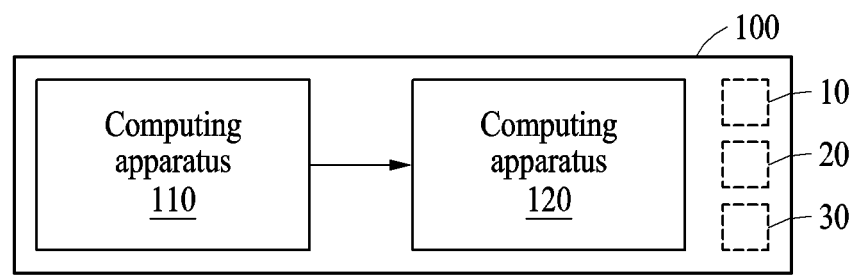
FIG. 1 illustrates an example electronic system with data compression and decompression according to one or more embodiments.

Throughout the drawings and the detailed description, unless otherwise described or provided, it may be understood that the same, or like, drawing reference numerals refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Data compression may be divided into data lossy compression and data lossless compression. Typically, data lossy compression may not be able to fully reconstruct the original data, which may result in the loss of data when the data is decompressed. On the other hand, data lossless compression may allow the original data to be perfectly reconstructed to be identical to the original data.

FIG. 1 illustrates an example electronic device or system with data compression and decompression according to one or more embodiments.

Referring to FIG. 1, in a non-limiting example, an electronic device or system 100 for compressing and decompression of data may include a first computing apparatus 110 and a second computing apparatus 120. The electronic device or system 100 may also include processor 10, memory 20, and communications interface 30. In an example, the first computing apparatus 110 and/or the second computing apparatus 120 may be respective separate (or remote) devices in the electronic system 100, or they may be internal electronic apparatuses of the electronic device 100, noting that all below respective references to hardware and operations of the electronic apparatus are also applicable to such electronic devices. In an example, a processor 10 of the electronic device 100 may be configured to perform any one or any combination of operations or methods described herein, and/or a processor of the first computing 110 and/or processor of the second computing apparatus 120 may performed the respective compression and/or decompression operations described herein, using any one or any combination of memories or buffers of the first computing apparatus 110, the second computing apparatus 120, and/or memory 20 of the electronic device 100. The processor 10 of the electronic device m100 may also be configured to control other operations or functionalities, in addition to compression and decompression operations. The terms "decoding", "decompression," and "decompressing" may be used interchangeably below.

The first computing apparatus 110 may compress data including symbols using a variable length coding (VLC) scheme. For example, the first computing apparatus 110 may compress the data using Huffman coding without losing information about the symbols. The Huffman coding may be a scheme of compressing the data about the symbols using a binary tree or a Huffman tree for the symbols configured based on frequency of appearance of the symbols. Metadata about the binary tree may be associated with the compressed data to decode the compressed data. The compressed data for each of the symbols may be referred to as a codeword(s).

The second computing apparatus 120 may decode the compressed data using the metadata. For example, the second computing apparatus 120 may decode the compressed data by reading the compressed data (or the codewords) on a bit-by-bit basis and sequentially determining symbols matching the read bits using the metadata.

As the lengths of codewords for each of the symbols are different in the VLC scheme, lengths of codewords for combinations of different symbols may be different even if a number of the symbols is the same. In some examples, length information for the lengths of the codewords for the symbols may not be included in the compressed data or the metadata. In an instance where there is no length information of the codewords for the symbols, bits of the compressed data may be processed only in series. When the length information of the codewords for the symbols does exist in association with the compressed data or the metadata, the codewords are divided into a plurality of groups and the divided groups may be processed in parallel.

A method of processing compressed data in parallel will be described in detail below with reference to FIGS. 2 to 13. A method of generating compressed data will be described with reference to FIGS. 2 to 5B, and a method of decoding compressed data will be described with reference to FIGS. 6 to 13.

Figure 2:
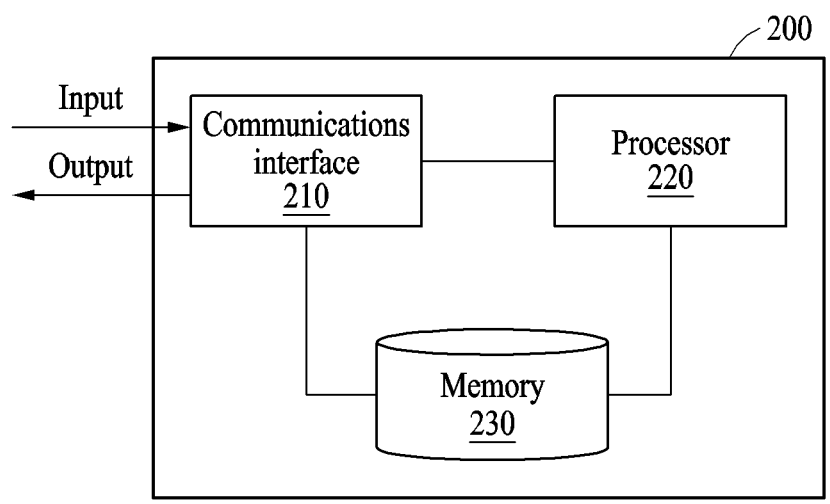
FIG. 2 illustrates an example electronic apparatus for compressing data according to one or more embodiments.

FIG. 2 illustrates an example electronic apparatus for compressing data according to one or more embodiments.

An electronic apparatus 200 may include a communications interface 210, a processor 220, and a memory 230. For example, the electronic apparatus 200 may be the first computing apparatus 110 described above with reference to FIG. 1. The communication interface 30 of FIG. 1 may have same configurations of any or all of the communication systems described herein.

Referring to FIG. 2, in a non-limiting example, the communications interface 210 may be connected to the processor 220 and the memory 230 and transmit and receive data to and from the processor 220 and the memory 230. The communications interface 210 may be connected to another external apparatus and transmit and receive data to and from the external apparatus. Hereinafter, transmitting and receiving "A" may refer to transmitting and receiving "information or data of or indicating A".

The processor 220 may be configured to execute computer-readable instructions, which when executed by the processor 220, to configure the processor 220 to perform one or more or all operations and/or methods involving the compressing of data or perform any one or any combination of the operations and/or methods described herein. The processor 220 may include any one or a combination of two or more of, for example, a central processing unit (CPU), a processor core, a multi-core processor, a multiprocessor, an application-specific integrated circuit (ASIC), and a field-programmable gate array (FPGA). The processor 220 may also execute other computer-readable instructions, programs, or applications to control other functionalities of the electronic device.

The memory 230 may be configured to store, or store, any of the computer-readable instructions described herein. The memory 230 may be a volatile or nonvolatile memory.

The memory 230 may include, for example, random-access memory (RAM), dynamic random-access memory (DRAM), static random-access memory (SRAM), or other types of non-volatile memory known in the art.

The communication interface 210 may include a network interface or other wired and/or hardware interfaces (e.g., I/O hardware and/or transceivers) for connecting to a network and/or provide a data transfer channel with a mobile storage medium (e.g., the memory 230 and/or memory 30 of FIG. 1). The communicator 210 may be implemented as circuitry in the electronic apparatus 200. For example, the communicator 210 may include an internal bus and an external bus.

Figure 3:
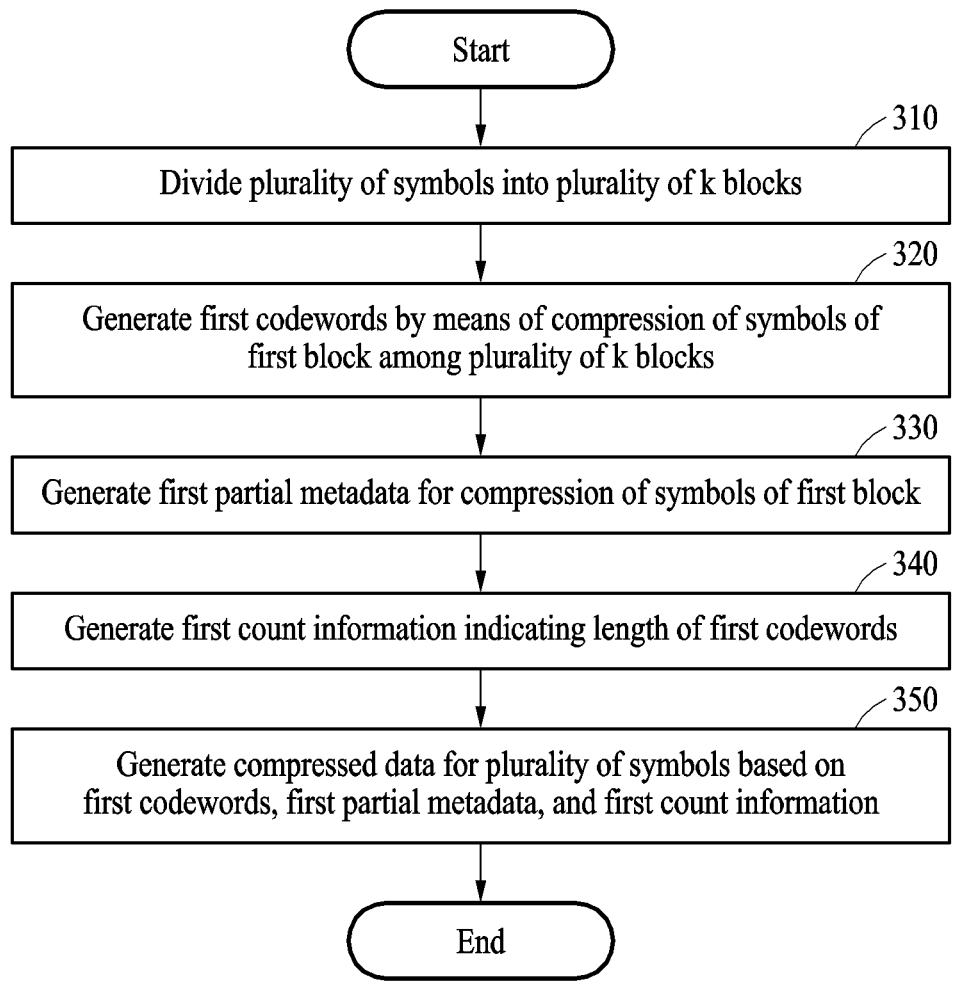
FIG. 3 illustrates an example method of generating compressed data according to one or more embodiments.

FIG. 3 illustrates an example method of generating compressed data according to one or more embodiments.

In an example, the operations 310 to 350 of FIG. 3 may be performed by an electronic apparatus, such as the electronic apparatus 200 described above with reference to FIG. 2, as a non-limiting example.

Referring to FIG. 3, in a non-limiting example, the electronic apparatus 200 may obtain data about a plurality of symbols before operation 310 is performed. For example, a symbol may be an alphanumeric character or a special character, but it is not limited thereto. For example, the data about the plurality of symbols may be bit data based on Unicode or an ASCII code used in the electronic apparatus.

In operation 310, the electronic apparatus may divide the plurality of symbols into a plurality of k blocks. For example, when a number of the plurality of symbols is 40 and k is 4, 40 symbols may be divided into four blocks such that a first block includes 10 symbols, a second block includes 10 symbols, a third block includes 10 symbols, and a fourth block includes 10 symbols. In the above-described example, each block includes the same number of symbols, but examples are not limited thereto, and a plurality of symbols may be divided such that the number of symbols included in each of the plurality of k blocks is different from each other depending on an implementation example.

In an example, the value k may correspond to a number of decoding engines for decoding compressed data, which will be described in greater detail below with reference to FIG. 6.

In operation 320, the electronic apparatus may generate first codewords by compressing symbols of the first block among the plurality of k blocks. For example, the electronic apparatus may generate the first codewords by processing the symbols of the first block using Huffman coding.

The electronic apparatus may generate codewords for each of the other blocks as well as the first block. Operation 320 may be repeatedly performed to generate the codewords for each of the plurality of k blocks.

In operation 330, the electronic apparatus may generate first partial metadata for the compression of the symbols of the first block. The first partial metadata may include binary tree information or Huffman tree information about the Huffman coding for the symbols of the first block.

The electronic apparatus may generate partial metadata for each of the other blocks as well as the first block. Operation 330 may be repeatedly performed to generate partial metadata for each of the plurality of k blocks.

In operation 340, the electronic apparatus may generate first count information indicating a length of the first codewords. The length of the first codewords may be a number of bits representing the first codewords.

The electronic apparatus may generate count information indicating a length of codewords for each of the other blocks as well as the first codewords of the first block. Operation 340 may be repeatedly performed to generate the count information for each of the plurality of k blocks.

In operation 350, the electronic apparatus may generate compressed data for the plurality of symbols based on the first codewords, the first partial metadata, and the first count information.

A method of generating compressed data for a plurality of symbols based on first codewords, first partial metadata, and first count information (e.g., operation 350) will be described in greater detail below with reference to FIG. 4.

Figure 4:
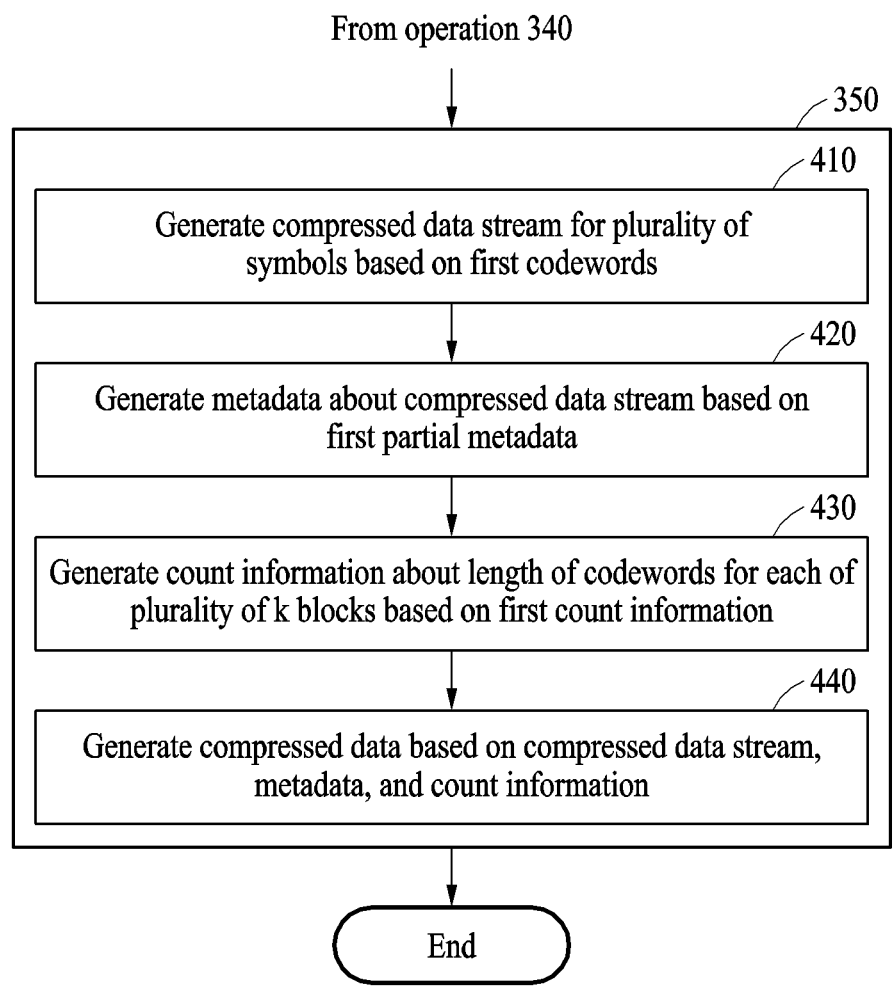
FIG. 4 illustrates an example method of generating compressed data based on a compressed data stream, metadata, and count information according to one or more embodiments.

FIG. 4 illustrates an example method of generating compressed data based on a compressed data stream, metadata, and count information according to one or more embodiments.

According to an example, operation 350 described above with reference to FIG. 3 may include operations 410 to 440. Operations 410 to 440 may be performed by an electronic apparatus, such as the electronic apparatus 200 described above with reference to FIG. 2, as a non-limiting example.

Referring to FIG. 4, in a non-limiting example, in operation 410, the electronic apparatus may generate a compressed data stream for a plurality of symbols based on first codewords. For example, when the plurality of symbols is divided into four blocks, the compressed data stream may include the first codewords for a first block, second codewords for a second block, third codewords for a third block, and fourth codewords for a fourth block.

In operation 420, the electronic apparatus may generate metadata about the compressed data stream based on respective partial metadata for each block. For example, when the plurality of symbols is divided into four blocks, the metadata may include the first partial metadata about the first block, second partial metadata about the second block, third partial metadata about the third block, and fourth partial metadata about the fourth block.

In operation 430, the electronic apparatus may generate count information about a length of codewords for each of the plurality of k blocks based on first count information. For example, when the plurality of symbols is divided into four blocks, the count information may include the first count information about a length of the first codewords of the first block, second count information about a length of the second codewords of the second block, third count information about a length of the third codewords of the third block, and fourth count information about a length of the fourth codewords of the fourth block.

In operation 440, the electronic apparatus may generate compressed data based on the compressed data stream, the metadata, and the count information. For example, the compressed data may include the compressed data stream, the metadata, and the count information.

Figure 5A:
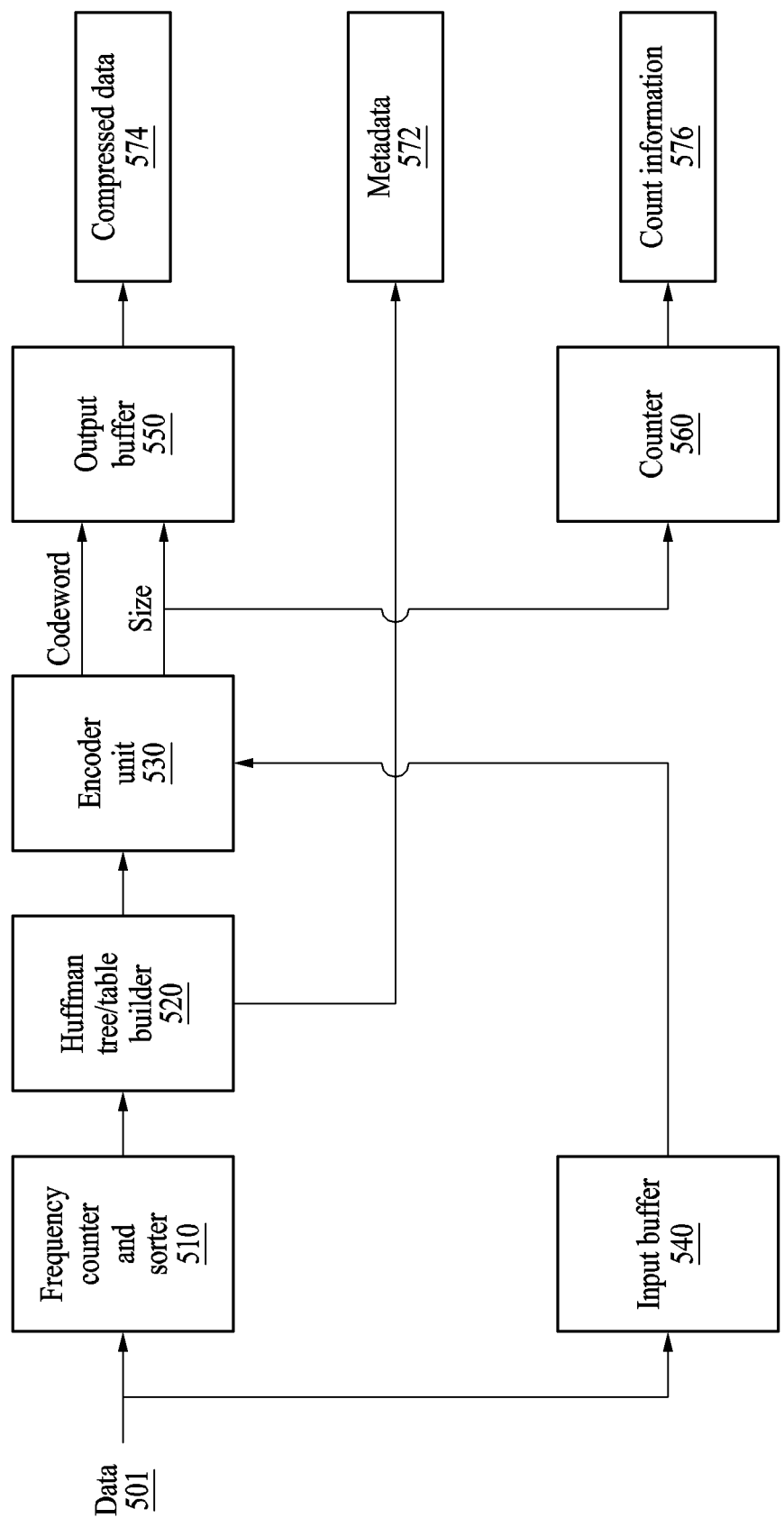
FIG. 5A illustrates an example method of generating a compressed data stream, metadata, and count information according to one or more embodiments.

FIG. 5A illustrates an example method of generating a compressed data stream, metadata, and count information according to one or more embodiments.

Referring to FIG. 5A, in a non-limiting example, the electronic apparatus 200 described above with reference to FIG. 2, as a non-limiting example, may include a frequency counter and sorter 510, a Huffman tree/table builder 520, an encoder 530, an input buffer 540, an output buffer 550, and a counter 560. The frequency counter and sorter 510, the Huffman tree/table builder 520, the encoder 530, the input buffer 540, the output buffer 550, and the counter 560 may each be implemented through hardware or through hardware and computer-readable instructions. As a non-limiting example, the frequency counter and sorter 510, the Huffman tree/table builder 520, the encoder 530, the input buffer 540, the output buffer 550, and the counter 560 may be implemented based on hardware resources of the communications interface 210, the processor 220, and the memory 230 of the electronic apparatus 200.

The frequency counter and sorter 510 may receive data about a plurality of symbols to be compressed. The frequency counter and sorter 510 may divide the plurality of symbols into a plurality of blocks. The frequency counter and sorter 510 may calculate frequency of appearance of the symbols included in each of the blocks.

The Huffman tree/table builder 520 may generate Huffman tree information about a corresponding block based on the calculated frequency of appearance of the symbols. The Huffman tree information for each of the blocks may be different from each other. The Huffman tree/table builder 520 may generate partial meta data about the blocks based on the Huffman tree information. The Huffman tree/table builder 520 may generate metadata 572 that includes the partial metadata.

The input buffer 540 may store data 501 about the plurality of symbols to be compressed. The data 501 stored in the input buffer 540 may be provided to the encoder 530.

The encoder 530 may compress the data 501 based on the Huffman tree information about the blocks generated by the Huffman tree/table builder 520. For example, the Huffman tree/table builder 520 may generate codewords by compressing the data 501. For example, the Huffman tree/table builder 520 may generate first codewords for a first block and second codewords for a second block. In an example, a processor (e.g., the processor 220 of FIG. 2) may be configured to perform any or all operations of compression or encoding by encoding described herein, or the encoder 530 may also be representative of a processor configured to perform any or all operations of compression or encoding described herein, or representative of the processor and a memory also represented by the encoder 530, where the execution of computer-readable instructions stored in the memory may configure the processor to perform such operations.

The counter 560 may generate count information 576 by counting a length of codewords generated by the encoder 530. For example, the count information 576 may include first count information obtained by counting a length of the first codewords and second count information obtained by counting a length of the second codewords.

The output buffer 550 may store the codewords generated by the encoder 530. The codewords stored in the output buffer 550 may be a compressed data stream 574.

Figure 5B:
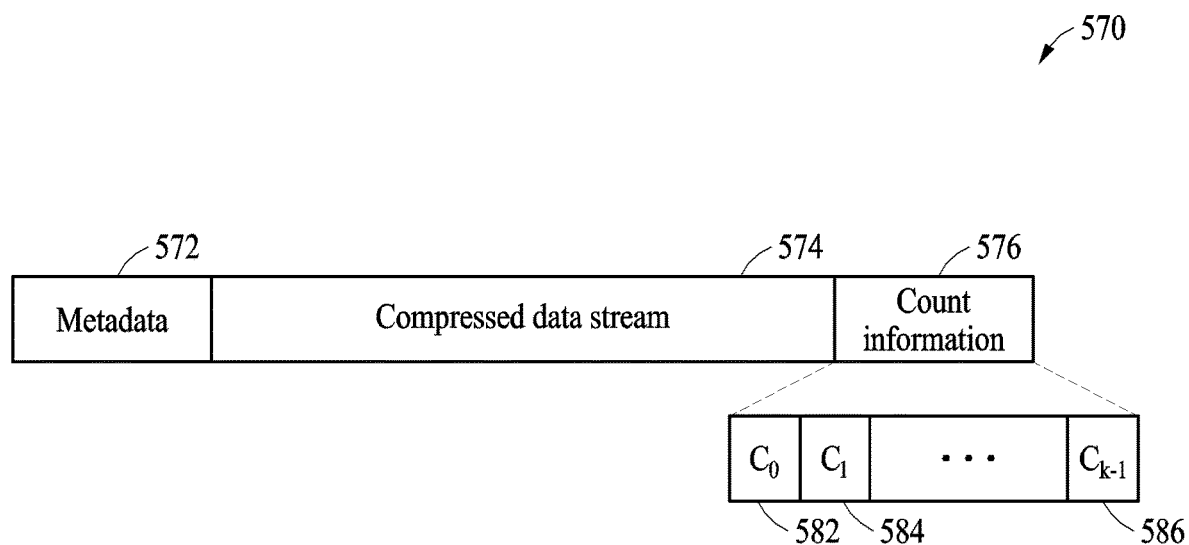
FIG. 5B illustrates an example of compressed data including a compressed data stream, metadata, and count information according to one or more embodiments.

FIG. 5B illustrates an example compressed data including a compressed data stream, metadata, and count information according to one or more embodiments.

Referring to FIG. 5B, in a non-limiting example, the compressed data 570 may include the metadata 572, the compressed data stream 574, and the count information 576. The count information 576 may include first count information 582, second count information 584, and k-th count information 586.

Figure 6:
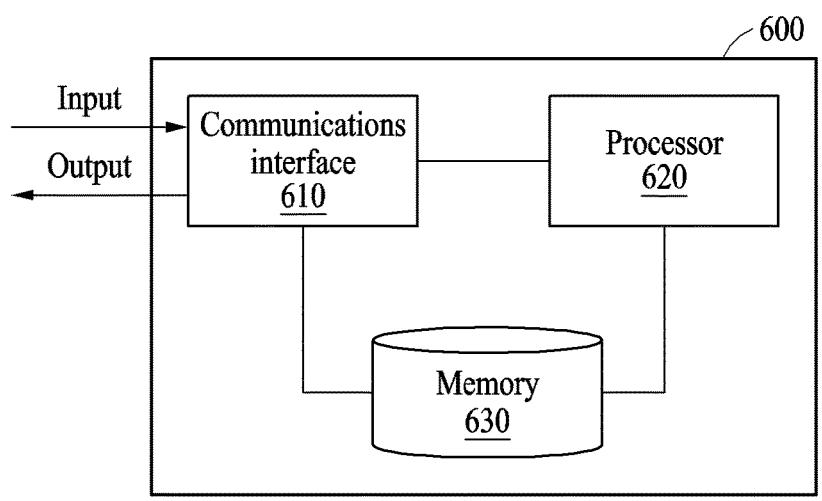
FIG. 6 illustrates an example electronic apparatus for decoding a compressed data stream according to one or more embodiments.

FIG. 6 illustrates an example electronic apparatus for decoding a compressed data stream according to one or more embodiments.

Referring to FIG. 6, in a non-limiting example, an electronic apparatus may include a communications interface 610, a processor 620, a memory 630, and display device. For example, the electronic apparatus 600 may be the second computing apparatus 120 described above with reference to FIG. 1, as a non-limiting example. In addition, the configurations and operation of the communications interface 210, processor 220, and memory 230 of the electronic apparatus 200 of FIG. 2 may be same and/or respectively applicable with respect to the communications interface 610, the processor 620, and the memory 630 of the electronic apparatus 600, so similar descriptions regarding the same are therefore omitted.

The processor 620 may be configured to execute computer-readable instructions that, when executed by the processor 620, configure the processor 620. For example, the memory 630 may be configured to store or stores the computer-readable instructions to perform one or more or all operations and/or methods involving the decoding of compressed data, and/or perform any one or any combinations of the operations and/or methods described herein.

Figure 7:
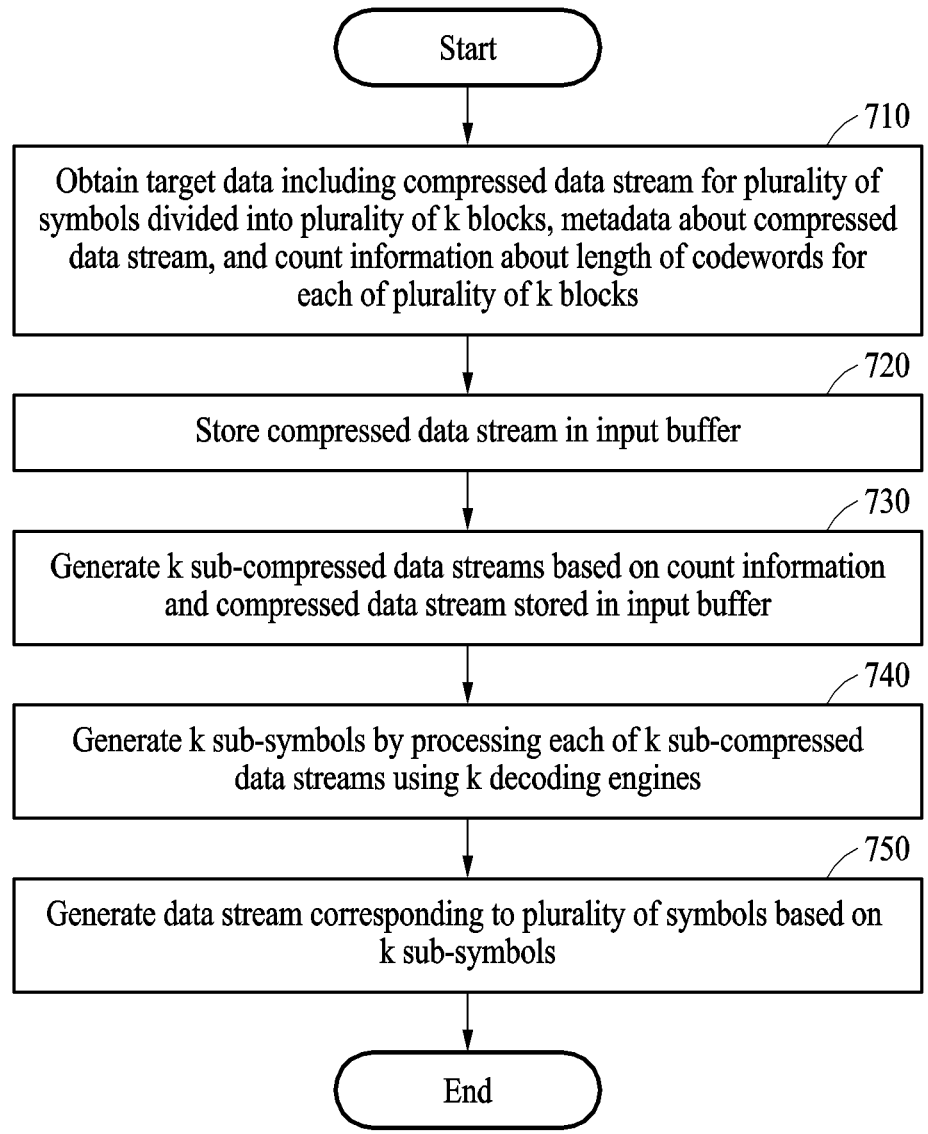
FIG. 7 illustrates an example method of decoding a compressed data stream according to one or more embodiments.

FIG. 7 illustrates an example method of decoding a compressed data stream according to one or more embodiments.

Referring to FIG. 7, in a non-limiting example, operations 710 to 750 may be performed by an electronic apparatus, such as the electronic apparatus 600 described above with reference to FIG. 6, as a non-limiting example.

In operation 710, the electronic apparatus may obtain target data to be decompressed. For example, the electronic apparatus may obtain the target data by receiving compressed data (e.g., the compressed data 570 described above with reference to FIG. 5B) from another apparatus, such as the electronic apparatus 200 of FIG. 2 as a non-limiting example. In an example, the target data may include a compressed data stream (e.g., the compressed data stream 574 of FIG. 5B) for a plurality of symbols divided into a plurality of k blocks, metadata (e.g., the metadata 572 of FIG. 5B) about the compressed data stream, and count information (e.g., the count information 576 of FIG. 5B) about a length of codewords for each of the plurality of k blocks. In an example, the target data may be other compressed data that includes another compressed data stream for a plurality of symbols that were divided into a plurality of k blocks, other metadata about the another compressed data stream, and other count information about a length of the codewords for the other plurality of k blocks.

In operation 720, the electronic apparatus may store the compressed data stream of the target data in an input buffer of the electronic apparatus. For example, the input buffer may store codewords of the compressed data stream on a n-bit basis. N bits may be a size of an array of a buffer.

In operation 730, the electronic apparatus may generate k sub-compressed data streams based on the count information of the target data and the compressed data stream stored in the input buffer. For example, each of the k sub-compressed data streams may include codewords in multiples of n bits.

A method of generating k sub-compressed data streams will be described in greater detail below with reference to FIGS. 8 and 9.

In operation 740, the electronic apparatus may generate k sub-symbols by processing each of the k sub-compressed data streams using k decoding engines. For example, a first decoding engine may generate first sub-symbols based on a first sub-compressed data stream provided to a first decoding engine. For example, when a total number of the plurality of symbols is 40 and k is 4, a number of the first sub-symbols may be 10. In an example, the k sub-compressed data streams are decoded using the k decoding engines to arrive at a k number of sub-symbols.

A method of generating k sub-symbols will be described in greater detail below with reference to FIGS. 9 and 10.

In operation 750, the electronic apparatus may generate an output data stream corresponding to the plurality of symbols based on the k sub-symbols. Each of the plurality of symbols may be an alphanumeric character or a special character, but is not limited thereto. For example, an output data stream corresponding to the plurality of symbols may be bit data based on Unicode or an ASCII code.

Figure 8:
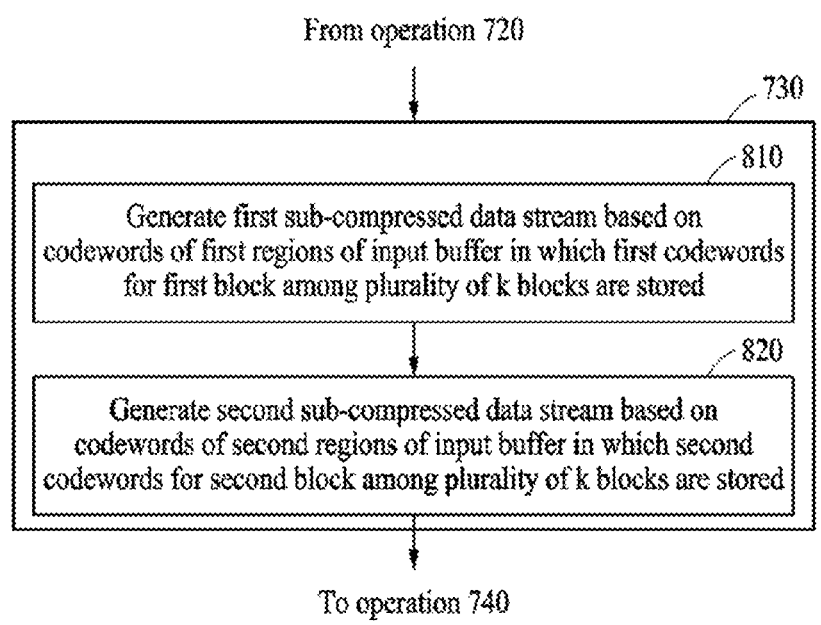
FIG. 8 illustrates an example method of generating k sub-compressed data streams according to one or more embodiments.

FIG. 8 illustrates an example method of generating k sub-compressed data streams according to one or more embodiments.

Referring to FIG. 8, in a non-limiting example, an operation (e.g., operation 730 described above with reference to FIG. 7) may include operations 810 and 820 to be described hereinafter. Operations 810 and 820 may be performed by an electronic apparatus (e.g., electronic apparatus 600 of FIG. 6, as a non-limiting example).

In operation 810, the electronic apparatus may generate a first sub-compressed data stream based on codewords of first regions of an input buffer in which first codewords for a first block among a plurality of k blocks are stored. For example, when a size of an array of an input buffer is n bits and lengths of the first codewords is greater than or equal to n, the first regions may include a plurality of arrays in which the first codewords are stored. For example, when the size of the array of the input buffer is 16 bits, and the lengths of the first codewords is 34, the first regions may include a first array, a second array, and a third array which are consecutive arrays. In the above-described example, when the first array includes only one codeword, the first regions may further include a fourth array including one last codeword.

The electronic apparatus may generate an entire group of data represented by a plurality of arrays in which the first codewords are stored as the first sub-compressed data stream. The first sub-compressed data stream may include bits in multiples of n.

In operation 820, the electronic apparatus may generate a second sub-compressed data stream based on codewords of second regions of an input buffer in which second codewords for a second block among the plurality of k blocks are stored. For example, when a size of an array of an input buffer is n bits and lengths of the second codewords is greater than or equal to n, the second regions may include a plurality of arrays in which the second codewords are stored.

When the first codewords and the second codewords are consecutive, a last codeword of the first codewords and a starting codeword of the second codewords may be consecutive bits. When the last codeword of the first codewords is not included in an array (e.g., the third array) of the input buffer, the last codeword of the first codewords and the starting codeword of the second codewords may be included in a same array. In this example, the first regions of the input buffer and the second regions of the input buffer may include at least one same overlap region (e.g., the third array).

The electronic apparatus may generate an entire group of data represented by a plurality of arrays in which the second codewords are stored as the second sub-compressed data stream. The second sub-compressed data stream may include bits in multiples of n. The description of operation 820 may also apply to a description of a generation of each of a third sub-compressed data stream to a k-th sub-compressed data stream.

Figure 9:
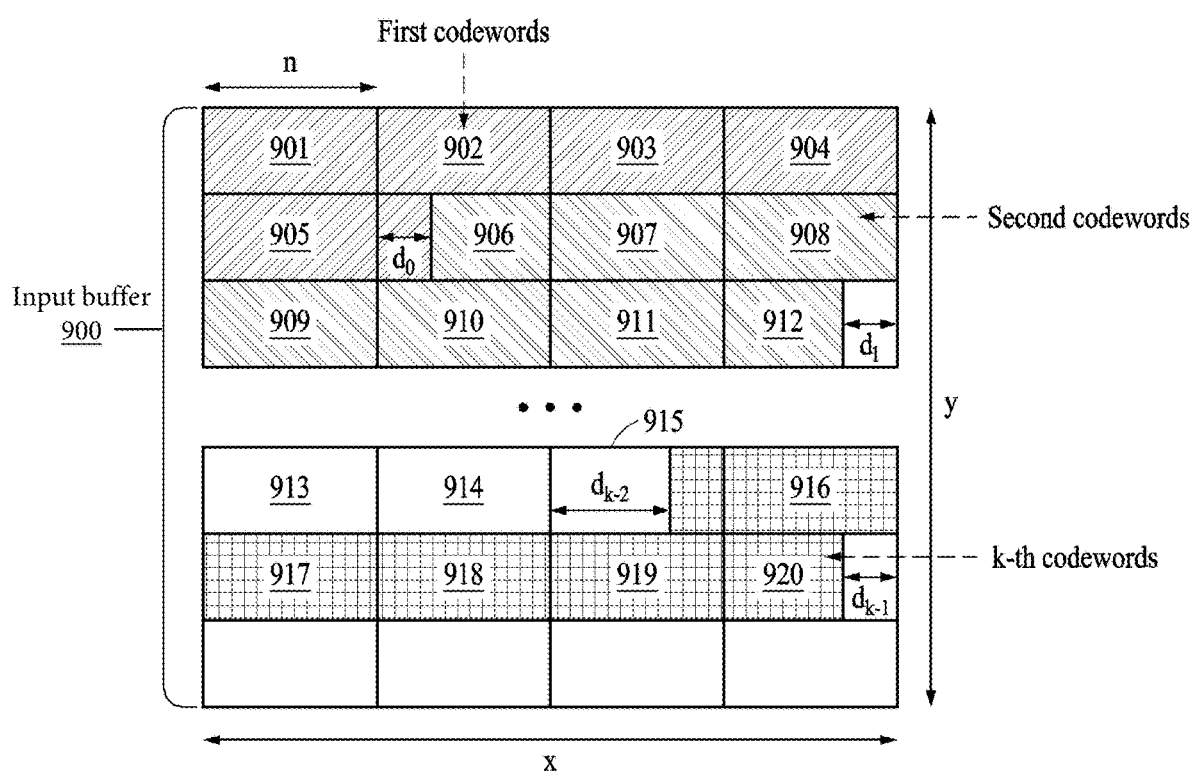
FIG. 9 illustrates an example input buffer in which a compressed data stream is stored according to one or more embodiments.

FIG. 9 illustrates an example of input buffer in which a compressed data stream is stored according to one or more embodiments.

Referring to FIG. 9, in a non-limiting example, an input buffer 900 may store a plurality of k codewords for a plurality of k blocks. For example, the input buffer 900 may have an address defined by a width X and a depth Y and may include storage spaces for storing n bits. A number of storage spaces may be X×Y. For example, the input buffer 900 may be static random access memory (SRAM). The input buffer may be a memory an electronic apparatus (e.g., the electronic apparatus 600 of FIG. 6).

The storage spaces of the input buffer 900 may be represented as arrays. For example, the input buffer 900 may include a first array 901 through a twentieth array 920. Each array may include n bits.

For example, first codewords may be stored in the first array 901 to a sixth array 906. When a starting codeword of the first codewords is stored in a start position of the first array 901, the first array 901 may include only bits of the first codewords. When the first codewords are not in multiples of n, the sixth array 906 may include at least a portion including a last codeword of the first codewords and at least a portion including a starting codeword of the second codewords. In an example, do may denote a number of bits of the first codewords included in the sixth array 906. The electronic apparatus may calculate do based on first count information (e.g., the first count information 582 of FIG. 5B) of count information (e.g., the count information 576 of FIG. 5B) and transmit the calculated do to a first decoding engine. In an example, do may be considered first aberration information.

For example, second codewords may be stored in the sixth array 906 to a twelfth array 912. When a starting codeword of the second codewords is stored in an intermediate position of the sixth array 906, the sixth array 906 may include bits of the first codewords and bits of the second codewords. In an example, $d_1$ may denote a number of bits of second codewords included in the twelfth array 912. The electronic apparatus may calculate $d_1$ based on second count information (e.g., the second count information 584 of FIG. 5B) of the count information (e.g., the count information 576 of FIG. 5B) and transmit the calculated $d_1$ to a second decoding engine. In an example, $d_1$ may be second aberration information.

For example, k-th codewords may be stored in a fifteenth array 915 to the twentieth array 920. When a starting codeword of the k-th codewords is stored in an intermediate position of the fifteenth array 915, the fifteenth array 915 may include bits of k−1-th codewords and bits of the k-th codewords. In an example, $d_{k-2}$ may denote a number of the bits of the k−1-th codewords included in the fifteenth array 915. In an example, $d_{k-1}$ may denote a number of the bits of the k-th codewords included in the twentieth array 920. The electronic apparatus may calculate $d_{k-1}$ based on k-th count information (e.g., the k-th count information 586 of FIG. 5B) of the count information (e.g., the count information 576 of FIG. 5B) and transmit the calculated $d_{k-1}$ to a k-th decoding engine. In an example, $d_{k-1}$ may be k-th aberration information.

In an example, when an address of a predetermined array of the input buffer 900 is defined as {i, j} (i is an integer from 0 to X−1, and j is an integer from 0 to Y−1), $A_{e-1}$ denoting an address of a starting array for e-th codewords (e is any one of 1 to k) may be calculated by Equation 1 below, and $A_e$ denoting an address of a last array may be calculated by Equation 2 below.

$$A_{e-1} = \{i_{e-1}, j_{e-1}\} = \{((C_0 + \ldots + C_{e-2}) \bmod n) \mathrm{rem}\, X, \qquad \text{Equation 1}$$
$$((C_0 + \ldots + C_{e-2}) \bmod n) \bmod X\}$$

$$A_e = \{i_e, j_e\} = \{((C_0 + \ldots + C_{e-1}) \bmod n) \mathrm{rem}\, X, \qquad \text{Equation 2}$$
$$((C_0 + \ldots + C_{e-1}) \bmod n) \bmod X\};$$

When $A_0$ is calculated by Equation 1 and Equation 2, $(C_0 + \ldots + C_{e-2})$ may be regarded as 0. In an example, mod may denote a modulo operation, and rem may denote a remainder operation.

In an example, e-th aberration information may be calculated by Equation 3 below.

$$d_{e-1} = (C_0 + \ldots + C_{e-1}) \mathrm{rem}\, n \qquad \text{Equation 3}$$

According to an example, e-th count information about the e-th codewords may indicate a cumulative length of the first to e-th codewords. For example, the first count information may indicate a length of the first codewords, the second count information may indicate a sum of the length of the first codewords and a length of the second codewords, and the k-th count information may indicate a sum of the length of the first codewords to a length of the k-th codewords. In the above-described example, Equation 1, Equation 2, and Equation 3 may be changed to Equation 4, Equation 5, and Equation 6, respectively.

$$A_{e-1} = \quad \text{Equation 4}$$
$$\{i_{e-1}, j_{e-1}\} = \{((C_{e-2}) \bmod n) \text{rem } X, ((C_{e-2}) \bmod n) \bmod X\}$$
$$A_e = \{i_e, j_e\} = \{((C_{e-1}) \bmod n) \text{rem } X, ((C_{e-1}) \bmod n) \bmod X\} \quad \text{Equation 5}$$
$$d_{e-1} = (C_{e-1}) \text{rem } n \quad \text{Equation 6}$$

Each of k decoding engines may generate sub-symbols based on a sub-compressed data stream and aberration information. For example, the first decoding engine may generate first sub-symbols based on a first sub-compressed data stream and first aberration information.

A method of generating first sub-symbols by a first decoding engine based on a first sub-compressed data stream and first aberration information will be described in greater detail below with reference to FIG. 10.

Figure 10:
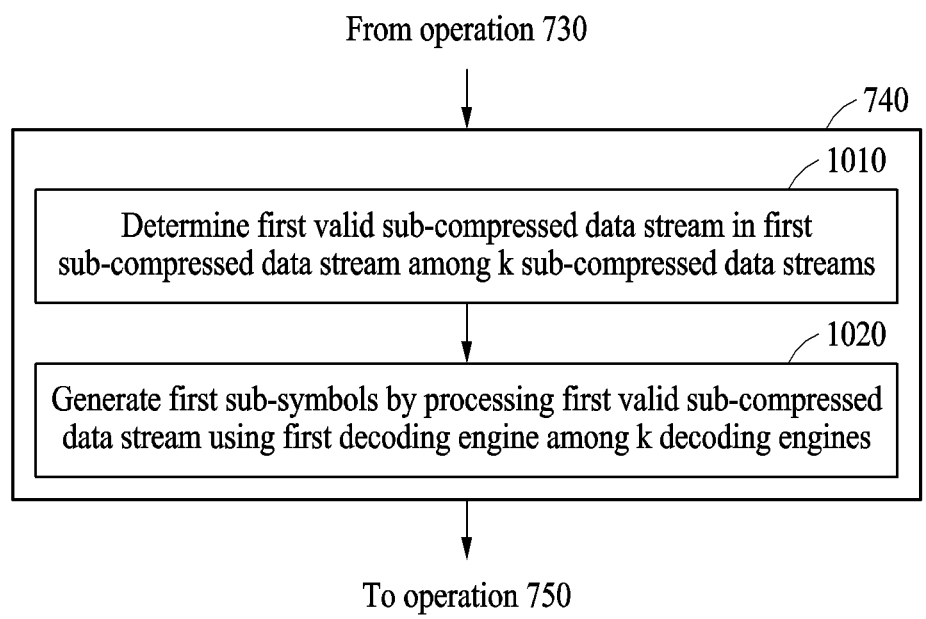
FIG. 10 illustrates an example method of generating first sub-symbols according to one or more embodiments.

FIG. 10 illustrates an example method of generating first sub-symbols according to one or more embodiments.

Referring to FIG. 10, in a non-limiting example, an operation (e.g., operation 740 described above with reference to FIG. 7) may include operations 1010 and 1020 to be described hereinafter. Operations 1010 and 1020 may be performed by an electronic apparatus (e.g., electronic apparatus 600 described above with reference to FIG. 6, as a non-limiting example). For example, operations 1010 and 1020 may be performed by a first decoding engine that may be implemented with hardware resources or hardware and computer-readable instruction resources of the electronic apparatus 600.

In operation 1010, the electronic apparatus may ascertain or find a first valid sub-compressed data stream in a first sub-compressed data stream. In the example described above with reference to FIG. 9, the electronic apparatus may ascertain the first valid sub-compressed data stream including first codewords based on first aberration information (e.g., do of FIG. 9) among bits (e.g., 6×n bits) included in the first array 901 to the sixth array 906 of the first regions of the input buffer 900.

Similar to operation 1010, the electronic apparatus may ascertain or find a second valid sub-compressed data stream in a second sub-compressed data stream. In the example described above with reference to FIG. 9, the electronic apparatus may find the second valid sub-compressed data stream including second codewords based on the first aberration information (e.g., d₀ of FIG. 9) and second aberration information (e.g., d₁ of FIG. 9) among bits (e.g., 6×n bits) included in the sixth array 906 to the twelfth array 912 of the second regions of the input buffer 900. Among the bits included in the sixth array 906, bits corresponding to the first aberration information may not be included in the second valid sub-compressed data stream. Among the bits included in the twelfth array 912, bits corresponding to the second aberration information may not be included in the second valid sub-compressed data stream.

In operation 1020, the electronic apparatus may generate first sub-symbols by processing the first valid sub-compressed data stream using a first decoding engine. For example, the first decoding engine may generate the first sub-symbols corresponding to the first codewords based on the first valid sub-compressed data stream and first partial metadata. Data about the generated first sub-symbols may be stored in an output buffer of the first decoding engine. For example, the data about the first sub-symbols may be bit data based on Unicode or an ASCII code used in the electronic apparatus.

Each of k decoding engines may generate sub-symbols corresponding to an individual decoding engine by performing operations 1010 and 1020. In an example, k sub-symbols generated by the k decoding engines may form a plurality of symbols. In an example, data about the k sub-symbols generated by the k decoding engines may be same as the data 501 about the plurality of symbols described above with reference to FIG. 5A.

Figure 11:
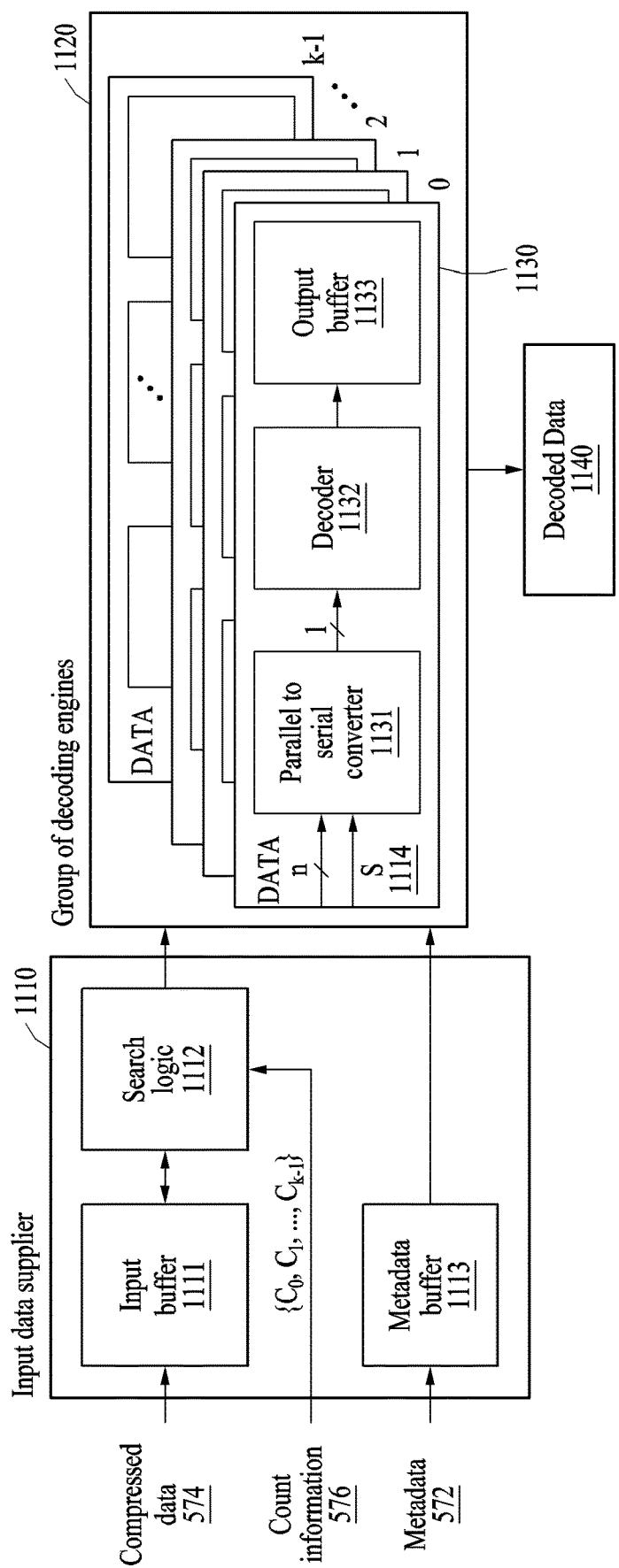
FIG. 11 illustrates an example method of generating a data stream decoded based on a compressed data stream, metadata, and count information according to one or more embodiments.

FIG. 11 illustrates an example method of generating a data stream decoded based on a compressed data stream, metadata, and count information according to one or more embodiments.

Referring to FIG. 11, in a non-limiting example, an electronic apparatus (e.g., the electronic apparatus 600 described above with reference to FIG. 6, as a non-limiting example) may include an input data supplier 1110 and a group 1120 of decoding engines. For example, the input data supplier 1110 may include an input buffer 1111, search logic 1112, and a metadata buffer 1113. For example, the group 1120 of decoding engines may include k decoding engines including a first decoding engine 1130. The first decoding engine 1130 may include a parallel to serial converter 1131, a 1132, and an output buffer 1133. The input buffer 111, the search logic 1112, the metadata buffer 1113, the parallel to serial converter 1131, the decoder 1132, and the output buffer 1133 may be implemented through hardware or through hardware and computer-readable instructions stored on memory (e.g., processor 620 and memory 630) of the electronic apparatus 600. For example, the input buffer 1111, the search logic 1112, the metadata buffer 1113, the parallel to serial converter 1131, the decoder 1132, and the output buffer 1133 may be implemented based on hardware resources of the communications interface 610, the processor 620, and the memory 630 of the electronic apparatus 600.

The input buffer 1111 may store a compress data stream (e.g., the compressed data stream 574 described above with reference to FIG. 5B).

In an example, the search logic 1112 may generate a plurality of sub-compressed data streams based on the compressed data stream 574 stored in the input buffer 1111 using the count information 576 described above with reference to FIG. 5B. For example, the search logic 1112 may generate a first sub-compressed data stream based on codewords of first regions of the input buffer 1111, generate a second sub-compressed data stream based on codewords of second regions, and a k-th sub-compressed data stream based on codewords of k-th regions. The input data supplier 1110 may provide each of k sub-compressed data streams generated by the search logic 1112 to a corresponding decoding engine. For example, the first sub-compressed data stream may be provided to the first decoding engine 1130.

The metadata buffer 1113 may store metadata (e.g., the metadata 572 described above with reference to FIG. 5B). The input data supplier 1110 may provide each of a plurality of pieces of metadata stored in the metadata buffer 1113 to a corresponding decoding engine. For example, first partial metadata may be provided to the first decoding engine 1130.

The input data supplier 1110 may calculate aberration information for each of the plurality of sub-compressed data streams based on a size (e.g., n) of an array of the input buffer 1111 and provide the calculated aberration information to a decoding engine. For example, first aberration information 1114 may be provided to the first decoding engine 1130.

In an example, the first decoding engine 1130 may serialize the first sub-compressed data stream through the parallel to serial converter 1131. The first decoding engine 1130 may determine a first valid sub-compressed data stream in the first sub-compressed data stream based on the first aberration information. The first valid sub-compressed data stream may correspond to first codewords representing first sub-symbols.

In an example, the parallel to serial converter 1131 may be an n:1 converter. In another example, the parallel to serial converter 1131 may be an n:n converter.

The decoder 1132 may generate the first sub-symbols corresponding to the first codewords based on the first valid sub-compressed data stream and the first partial metadata. The decoder 1132 may store data about the first sub-symbols in the output buffer 1133. The data about the first sub-symbols may be bit data based on Unicode or an ASCII code used in the electronic apparatus 600.

According to an example, a storage capacity of the output buffer may be a size capable of, or sufficient to, storing data about the first sub-symbols. For example, when a length of Unicode for a symbol is 16 bits and a number of first sub-symbols is 10, the storage capacity of the output buffer 1133 may be 160 bits.

Each of the k decoding engines of the group 1120 of decoding engines may output data about sub-symbols provided to each of the decoding engines. The k decoding engines may operate independently or in parallel with each other.

The group 1120 of decoding engines may output decoded data 1140 based on the data about the plurality of sub-symbols output by the k decoding engines. The decoded data 1140 may be a data stream corresponding to a plurality of symbols.

Figure 12:
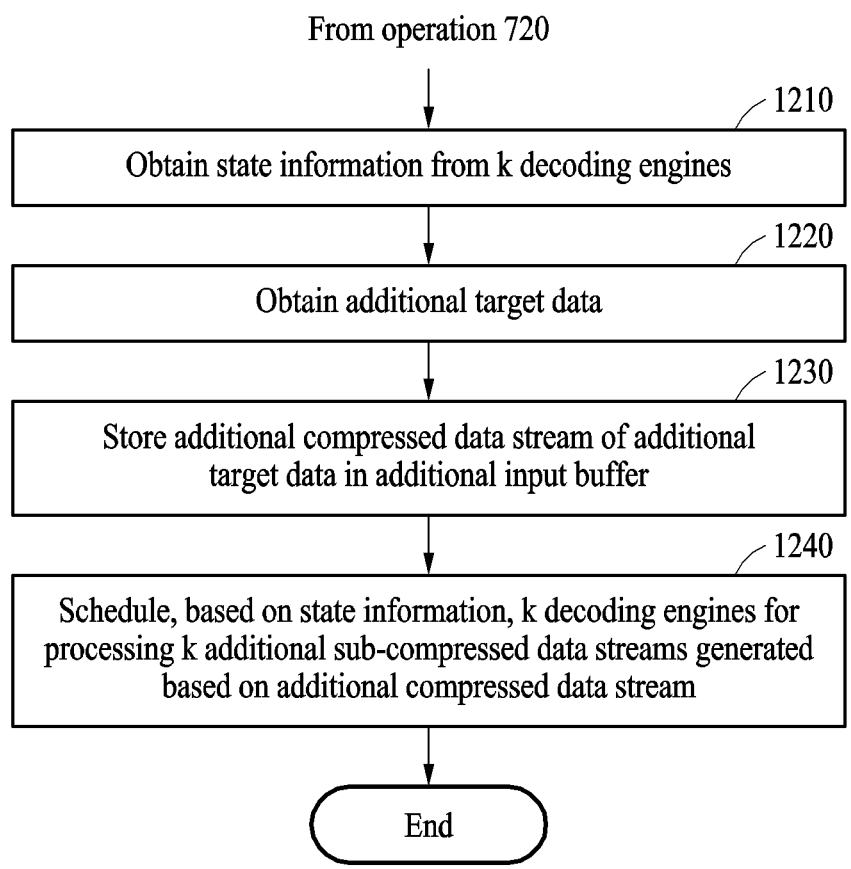
FIG. 12 illustrates an example method of scheduling k decoding engines according to one or more embodiments.

FIG. 12 illustrates an example method of scheduling k decoding engines of an electronic apparatus according to one or more embodiments.

in an example, and although k decoding engines start decoding target data simultaneously, a compression rate of a sub-compressed data stream or a valid sub-compressed data stream provided to each of the k decoding engines may be different from each other, and a time point when each of the k decoding engines completes decoding may be different from each other.

In an example, although some of the decoding engines may not finish decoding the target data, when there is additional target data that needs, or is desired, to be decoded in the electronic apparatus 600, the electronic apparatus 600 may provide an additional sub-compressed data stream of the additional target data to a decoding engine in an idle state, thereby increasing operation rates of the k decoding engines.

Referring to FIG. 12, in a non-limiting example, operations 1210 to 1240 may be performed after operation 720 described above with reference to FIG. 7 is performed. Operations 1210 to 1240 may be performed an electronic apparatus (e.g., by the electronic apparatus 600 described above with reference to FIG. 6).

In operation 1210, the electronic apparatus may obtain state information from the k decoding engines. For example, the state information may indicate whether a corresponding decoding engine has completed its decoding. For example, the state information may indicate whether the corresponding decoding engine is in an idle state (e.g., a complete decoding).

In operation 1220, in an example, the electronic apparatus may obtain additional target data. The additional target data may include an additional compressed data stream for a plurality of additional symbols divided into a plurality of k blocks, additional metadata about the additional compressed data stream, and additional count information about a length of additional codewords for each of the plurality of k blocks. The descriptions of the compressed data stream, the metadata, and the count information of the target data described above with reference to FIG. 7 may also apply to descriptions of the additional compressed data stream, the additional metadata, and the additional count information of the additional target data.

In operation 1230, the electronic apparatus may store the additional compressed data stream of the additional target data in an additional input buffer. For example, the electronic apparatus may store the additional target data in the additional input buffer different from an input buffer in which the target data is stored (e.g., in the memory 630). An example of the additional input buffer will be described in greater detail below with reference to FIG. 13.

In operation 1240, the electronic apparatus may schedule, based on state information, the k decoding engines for processing k additional sub-compressed data streams generated based on the additional compressed data stream.

According to an example, when a h-th decoding engine is in an idle state among the k decoding engines for processing the k sub-compressed data streams of the target data, the h-th decoding engine may be scheduled to process an h-th additional sub-compressed data stream among the k additional sub-compressed data streams of the additional target data.

Figure 13:
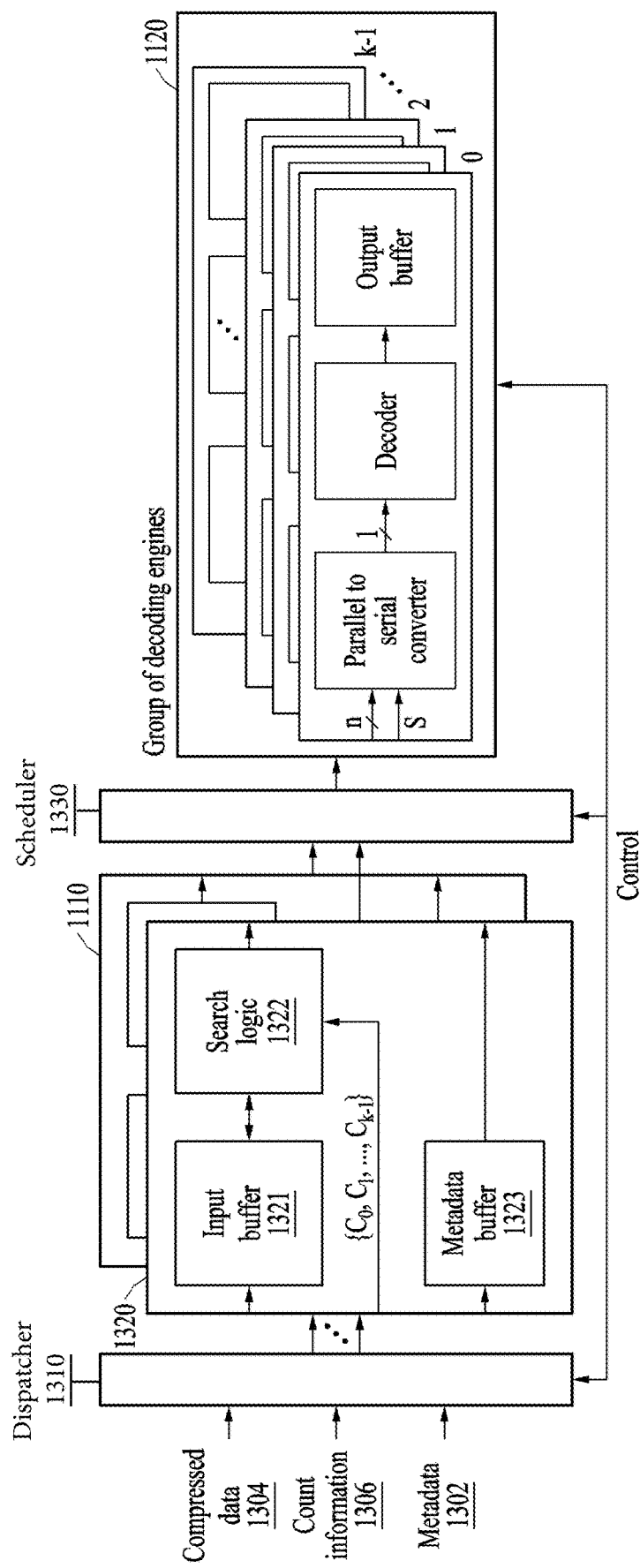
FIG. 13 illustrates an example method of scheduling k decoding engines according to one or more embodiments.

According to an example, a decoding engine that enters an idle state the earliest, among the k decoding engines for processing the k sub-compressed data streams of the target data, may be scheduled to process an additional sub-compressed data stream in which a length of codewords is longest among the k additional sub-compressed data streams of the additional target data FIG. 13 illustrates an example method of scheduling k decoding engines according to one or more embodiments.

In a non-limiting example, the electronic apparatus 600 described above with reference to FIG. 11 may further include a dispatcher 1310, an additional input data supplier 1320, and a scheduler 1330. For example, the additional input data supplier 1320 may include an input buffer 1321, search logic 1322, and a metadata buffer 1323. The input buffer 1321 may be the additional input buffer described above with reference to FIG. 12.

The dispatcher 1310, the input buffer 1321, the search logic 1322, the metadata buffer 1323, and the scheduler 1330 may be implemented through hardware or a hardware and computer-readable instructions of the electronic apparatus 600. For example, the dispatcher 1310, the input buffer 1321, the search logic 1322, the metadata buffer 1323, and the scheduler 1330 may be implemented based on hardware resources of a communications interface 610, the processor 620, and the memory 630 of the electronic apparatus 600.

The dispatcher 1310 may provide an additional compressed data stream 1304, additional metadata 1302, and additional count information 1306 of additional target data to the additional input data supplier 1320.

The descriptions of the input buffer 1111, the search logic 1112, and the metadata buffer 1113 described above with reference to FIG. 11 may also apply to descriptions of the input buffer 1321, the search logic 1322, and the metadata buffer 1323.

The scheduler 1330 may receive state information from k decoding engines. The scheduler 1330 may schedule a target decoding engine in an idle state to process a target additional sub-compressed data stream among k additional sub-compressed data streams of the additional target data. For example, the target decoding engine may process the target additional sub-compressed data stream of the additional target data while other decoding engines are processing sub-compressed data streams of target data.

The electronic systems, electronic apparatuses, processors, memory (i.e., buffers), communications devices and systems, electronic system 100, first computing apparatus 110, second computing apparatus 120, electronic apparatuses 200 and 600, processors 10, 220, and 620, memories 20, 230, and 630, communications interfaces 30, 210, and 610, frequency counter and sorter 510, Huffman tree/table builder 520, encoder 530, input buffer 540, output buffer 550, counter 560, input buffer 900, input data supplier 1110, input buffer 1111, search logic 1112, metadata buffer 1113, first decoding engine 1130, parallel to serial converter 1131, decoder 1132, output buffer 1133, dispatcher 1310, additional input data supplier 1320, scheduler 1330, input buffer 1321, search logic 1322, and a metadata buffer 1323 described herein and disclosed herein described with respect to FIGS. 1-13 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents. i.e., all variations within the scope of the claims and their equivalents are to be construed as being included in the disclosure.

What is claimed is:

1. A processor-implemented method, the method comprising:
   obtaining target data comprising a compressed data stream for a plurality of symbols divided into a plurality of k blocks, metadata about the compressed data stream, and count information for each of the plurality of k blocks;
   storing the compressed data stream in an input buffer;
   generating k sub-compressed data streams based on the count information and the compressed data stream stored in the input buffer;
   generating k sub-symbols by processing each of the k sub-compressed data streams using k decoding engines; and
   generating an output decoded data stream corresponding to the plurality of symbols based on the k sub-symbols.

2. The method of claim 1, wherein the compressed data stream comprises codewords generated by processing the plurality of symbols using Huffman coding, and
   wherein the metadata comprises binary tree information about the Huffman coding.

3. The method of claim 1, wherein the count information comprises:
   first count information indicating a length of first codewords for symbols of a first block among the plurality of k blocks; and
   second count information indicating a length of second codewords for symbols of a second block among the plurality of k blocks.

4. The method of claim 1, wherein the count information comprises:
   first count information indicating a length of first codewords for a first block among the plurality of k blocks; and
   second count information indicating a sum of the length of the first codewords for the first block and a length of second codewords for a second block among the plurality of k blocks.

5. The method of claim 1, wherein the generating of the k sub-compressed data streams comprises:
   generating a first sub-compressed data stream based on codewords of first regions of the input buffer, in which first codewords for a first block among the plurality of k blocks are stored; and
   generating a second sub-compressed data stream based on codewords of second regions of the input buffer in which second codewords for a second block among the plurality of k blocks are stored.

6. The method of claim 5, wherein the first regions of the input buffer and the second regions of the input buffer comprise one or more same overlap regions.

7. The method of claim 1, wherein the generating of the k sub-symbols comprises:
   determining a first valid sub-compressed data stream in a first sub-compressed data stream among the k sub-compressed data streams; and
   generating first sub-symbols by processing the first valid sub-compressed data stream using a first decoding engine among the k decoding engines.

8. The method of claim 1, further comprising:
   obtaining state information from the k decoding engines; and
   scheduling, based on the state information, the k decoding engines for processing k additional sub-compressed data streams, of an additional compressed data stream of additional target data, generated based on the additional compressed data stream,
   wherein the k additional sub-compressed data streams are processed by the k decoding engines based on the scheduling.

9. An electronic apparatus, the apparatus comprising:
   a processor configured to execute instructions; and
   a memory storing the instructions, wherein execution of the instructions by the processor configures the processor to:
     obtain target data comprising a compressed data stream for a plurality of symbols divided into a plurality of k blocks, metadata about the compressed data stream, and count information for each of the plurality of k blocks;
     store the compressed data stream in an input buffer;
     generate k sub-compressed data streams based on the count information and the compressed data stream stored in the input buffer;
     generate k sub-symbols by processing each of the k sub-compressed data streams using k decoding engines; and
     generate a decoded output data stream corresponding to the plurality of symbols based on the k sub-symbols.

10. The electronic apparatus of claim 9, wherein the compressed data stream comprises codewords generated by processing the plurality of symbols using Huffman coding, and wherein the metadata comprises binary tree information about the Huffman coding.

11. The electronic apparatus of claim 9, wherein the count information comprises:
   first count information indicating a length of first codewords for symbols of a first block among the plurality of k blocks; and
   second count information indicating a length of second codewords for symbols of a second block among the plurality of k blocks.

12. The electronic apparatus of claim 9, wherein the count information comprises:
   first count information indicating a length of first codewords for a first block among the plurality of k blocks; and
   second count information indicating a sum of the length of the first codewords for the first block and a length of second codewords for a second count for a second block among the plurality of k blocks.

13. The electronic apparatus of claim 9, wherein the generating of the k sub-compressed data streams comprises:
   generating a first sub-compressed data stream based on codewords of first regions of the input buffer, in which first codewords for a first block among the plurality of k blocks are stored; and
   generating a second sub-compressed data stream based on codewords of second regions of the input buffer in which second codewords for a second block among the plurality of k blocks are stored.

14. The electronic apparatus of claim 9, wherein the generating of the k sub-symbols comprises:
   determining a first valid sub-compressed data stream in a first sub-compressed data stream among the k sub-compressed data streams; and
   generating first sub-symbols by processing the first valid sub-compressed data stream using a first decoding engine among the k decoding engines.

15. The electronic apparatus of claim 9, wherein the processor is further configured to perform:
   obtaining state information from the k decoding engines; and
   scheduling, based on the state information, the k decoding engines for processing k additional sub-compressed data streams, of an additional compressed data stream of additional target data, generated based on the additional compressed data stream,
   wherein the k additional sub-compressed data streams are processed by the k decoding engines based on the scheduling.

16. A processor-implemented method, the method comprising:
   dividing a plurality of symbols into a plurality of k blocks;
   generating first codewords by compressing symbols of a first block among the plurality of k blocks;
   generating first partial metadata for the compressing;
   generating first count information indicating a length of the first codewords; and
   generating compressed data representing the plurality of symbols based on the first codewords, the first partial metadata, and the first count information.

17. The method of claim 16, wherein the compressed data is a lossless compression of the plurality of symbols.

18. The method of claim 16, wherein the generating of the compressed data comprises:
   generating a compressed data stream for the plurality of symbols based on the first codewords;
   generating metadata about the compressed data stream based on the first partial metadata;
   generating count information about a length of codewords for each of the plurality of k blocks based on the first count information; and
   generating the compressed data based on the compressed data stream, the metadata, and the count information.

19. The method of claim 18, wherein the count information comprises:
   the first count information; and
   second count information indicating a sum of the length of the first codewords for the first block and a length of second codewords for a second count for a second block.

20. The method of claim 16, wherein the generating of the first codewords comprises generating the first codewords by processing the symbols of the first block using Huffman coding, and
   wherein the first partial metadata comprises binary tree information about the Huffman coding.

* * * * *